(12) United States Patent
Miyano

(10) Patent No.: US 10,960,652 B2
(45) Date of Patent: Mar. 30, 2021

(54) VEHICULAR UNDERCOVER

(71) Applicant: HAYASHI TELEMPU CORPORATION, Nagoya (JP)

(72) Inventor: Hiromichi Miyano, Aichi (JP)

(73) Assignee: HAYASHI TELEMPU CORPORATION, Nagoya (JP)

( * ) Notice: Subject to any disclaimer, the term of this patent is extended or adjusted under 35 U.S.C. 154(b) by 10 days.

(21) Appl. No.: 16/550,289

(22) Filed: Aug. 26, 2019

(65) Prior Publication Data

US 2020/0086615 A1 Mar. 19, 2020

(30) Foreign Application Priority Data

Sep. 19, 2018 (JP) ............... JP2018-174519

(51) Int. Cl.
| | | |
|---|---|---|
| *B32B 27/12* | (2006.01) | |
| *B32B 5/02* | (2006.01) | |
| *B32B 5/26* | (2006.01) | |
| *B32B 27/32* | (2006.01) | |
| *B62D 25/20* | (2006.01) | |
| *B60R 13/08* | (2006.01) | |

(52) U.S. Cl.
CPC ............ *B32B 27/12* (2013.01); *B32B 5/022* (2013.01); *B32B 5/26* (2013.01); *B32B 27/32* (2013.01); *B62D 25/2072* (2013.01); *B32B 2260/021* (2013.01); *B32B 2260/046* (2013.01); *B32B 2262/0284* (2013.01); *B32B 2262/101* (2013.01); *B32B 2307/10* (2013.01); *B32B 2307/724* (2013.01); *B32B 2605/00* (2013.01); *B32B 2605/08* (2013.01); *B60R 13/0861* (2013.01); *Y10T 428/24* (2015.01); *Y10T 428/249921* (2015.04); *Y10T 428/249962* (2015.04); *Y10T 428/27* (2015.01)

(58) Field of Classification Search
CPC ........... B32B 27/12; B32B 27/32; B32B 5/26; B32B 5/022; B32B 2307/724; B32B 2260/046; B32B 2307/10; B32B 2262/0284; B32B 2260/021; B32B 2262/101; B32B 2605/08; B32B 2250/03; B32B 2260/023; B32B 3/266; B32B 2307/718; B62D 25/2072; Y10T 428/249921; Y10T 428/249962; Y10T 428/27; Y10T 428/24; B60R 13/0861
See application file for complete search history.

(56) References Cited

U.S. PATENT DOCUMENTS

2018/0111571 A1* 4/2018 Miyano ................ B32B 19/045

FOREIGN PATENT DOCUMENTS

JP        2018-69813 A      5/2018

* cited by examiner

*Primary Examiner* — David Sample
*Assistant Examiner* — Donald M Flores, Jr.
(74) *Attorney, Agent, or Firm* — Yokoi & Co., U.S.A.; Toshiyuki Yokoi

(57) ABSTRACT

The present invention discloses an integrally molded vehicular undercover having air permeability includes a base material layer containing inorganic fibers and a first solidified thermoplastic binder, the base material layer having a road side surface and a vehicle body side surface, an outer layer containing synthetic resin fibers and a second solidified thermoplastic binder, the outer layer being integrated with the road side surface of the base material layer, and a synthetic resin layer having air permeability, the synthetic resin layer being integrated with the vehicle body side surface of the base material layer.

4 Claims, 9 Drawing Sheets

VEHICULAR UNDERCOVER

CROSS-REFERENCES TO RELATED APPLICATIONS

The present application is related to the Japanese Patent Application No. 2018-174519, filed Sep. 19, 2018, the entire disclosure of which is expressly incorporated by reference herein.

BACKGROUND OF THE INVENTION

1. Field of the Invention

The present invention relates to an integrally molded vehicular undercover.

2. Description of the Related Art

For example, vehicular undercovers such as an engine undercover, a floor undercover and the like are installed under a vehicle body for improving quietness inside a vehicle and for other purposes.

Japanese Patent Application Publication No. 2018-69813 discloses a vehicular undercover having a needle-punched first fiber layer containing inorganic fibers and a solidified thermoplastic binder; and a needle-punched second fiber layer containing inorganic fibers and a solidified thermoplastic binder. The first fiber layer and the second fiber layer are adhered to each other in a state that the undercover has a weak layer between the first fiber layer and the second fiber layer.

BRIEF SUMMARY OF THE INVENTION

The vehicular undercover is required to have durability against the contact of foreign matters such as stones, sound absorption property for absorbing road noise and engine noise having a frequency of approximately of 500 to 2000 Hz, and lightness for improving fuel consumption. In the vehicular undercover, when skin layers containing synthetic resin fibers are integrated with a road side surface and a vehicle body side surface, for example, the durability can be improved with the sound absorption property maintained. However, when the skin layers are integrated with both surfaces of the vehicular undercover, a weight of the vehicular undercover increases by the weight of the skin layers.

The present invention discloses a vehicular undercover having lightness yet excellent durability against the contact of foreign matters and excellent sound absorption property.

One embodiment of the present invention provides an integrally molded vehicular undercover having air permeability, the vehicular undercover comprising: a base material layer containing inorganic fibers and a first solidified thermoplastic binder; an outer layer containing synthetic resin fibers and a second solidified thermoplastic binder, the base material layer having a road side surface and a vehicle body side surface, the outer layer being integrated with the road side surface of the base material layer; and a synthetic resin layer having air permeability, the synthetic resin layer being integrated with the vehicle body side surface of the base material layer.

These and other features, aspects, and advantages of the invention will be apparent to those skilled in the art from the following detailed description of preferred non-limiting exemplary embodiments, taken together with the drawings and the claims that follow.

DETAILED DESCRIPTION OF THE INVENTION

Figure 1:
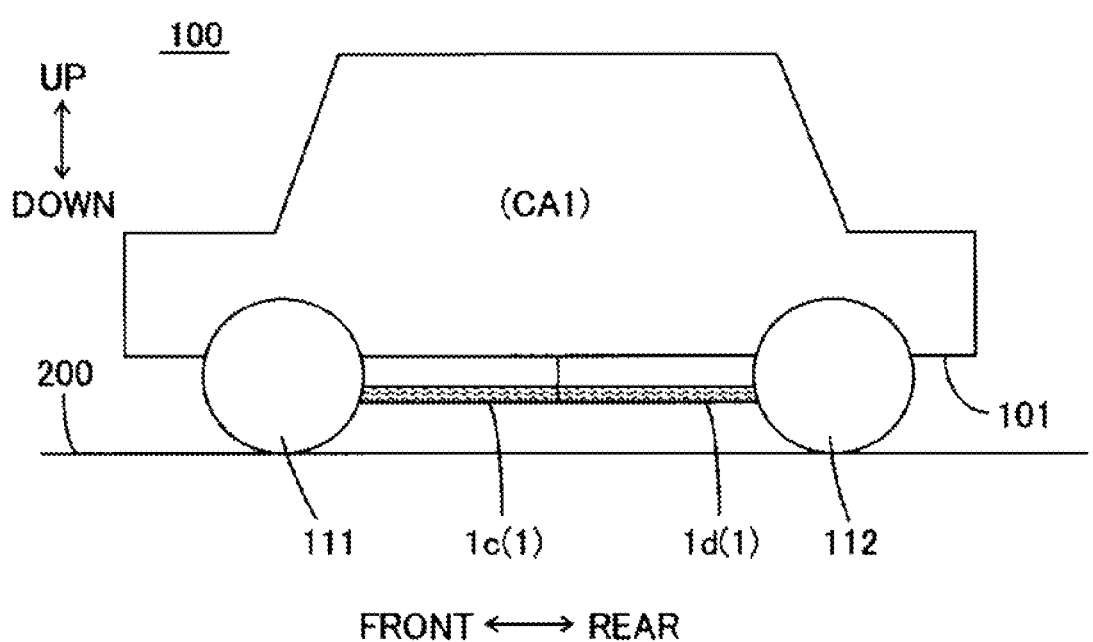
FIG. 1 is a side view schematically showing an example of an automobile having an undercover.

Hereafter, embodiments of the present invention will be explained. Of course, the below-described embodiments merely exemplify the present invention. All features disclosed in the embodiments are not necessarily essential for solving the present invention.

(1) OUTLINE OF TECHNOLOGY INCLUDED IN THE PRESENT INVENTION

First, with reference to the examples shown in FIGS. 1 to 9, an outline of the technology included in the present invention will be explained. Note that the drawings of the present application schematically show the examples. Thus, magnification ratios of each of the directions shown in the drawings may be different, and each of the drawings may not fit together. Of course, each element of the present technology is not limited to the concrete examples indicated by the reference letters.

In the present application, the numerical range "Min to Max" means that the range is equal to or more than the minimum value "Min" and is equal to or less than the maximum value "Max."

Embodiment 1

A vehicular undercover 1 concerning one embodiment of the present technology is an integrally molded vehicular undercover 1 having a base material layer 10, an outer layer 20 and a synthetic resin layer 30. The base material layer 10 contains inorganic fibers 11 and a first solidified thermoplastic binder 12. The outer layer 20 contains synthetic resin fibers 21 and a second solidified thermoplastic binder 22. The outer layer 20 is integrated with a road side surface 13a of the base material layer 10. The synthetic resin layer 30 has air permeability. The synthetic resin layer 30 is integrated with a vehicle body side surface 13b of the base material layer 10.

The vehicular undercover 1 has air permeability.

In the above described embodiment, since the synthetic resin fibers 21 are contained in the outer layer 20 of the road surface side of the vehicular undercover 1, excellent durability can be obtained against the contact of foreign matters such as stones. If the material containing the synthetic resin fibers and the solidified thermoplastic binder is used also for the layer of the vehicle body side of the vehicular undercover 1, the weight of the vehicular undercover increases by the weight of them. In the vehicular undercover 1 of the present embodiment, the layer of the vehicle body side is the synthetic resin layer 30 which has air permeability and is integrated with the vehicle body side surface 13b of the base material layer 10. Thus, the weight of the vehicular undercover 1 can be reduced while the durability of the vehicular undercover 1 is maintained compared to the case where the material containing the synthetic resin fibers and the solidified thermoplastic binder is used also for the layer of the vehicle body side of the vehicular undercover. In addition, since the synthetic resin layer 30 has air permeability, excellent sound absorption property can be obtained. Accordingly, the present embodiment can provide the vehicular undercover having lightness yet excellent durability against the contact of foreign matters such as stones and excellent sound absorption property.

Here, the inorganic fiber can be a glass fiber, a carbon fiber, a silicon carbide fiber, an alumina fiber, a ceramic fiber, a rock fiber, a slag fiber, or the like.

The thermoplastic binder can be fibrous or nonfibrous.

The base material layer can include other materials than the inorganic fibers and the thermoplastic binder. The base material layer can be a needle-punched layer. The base material layer can include a plurality of layers.

The outer layer can include other materials than the synthetic resin fibers and the thermoplastic binder. The outer layer can be a needle-punched layer. The outer layer can include a plurality of layers.

The synthetic resin layer integrated with the vehicle body side surface of the base material layer can be impregnated with the vehicle body side surface of the base material layer. If the synthetic resin layer has air permeability, it means that air can flow through from one surface to the other surface of the synthetic resin layer.

If the vehicular undercover has air permeability, it means that air can flow through from one surface to the opposite surface of the vehicular undercover.

The vehicular undercover can have the other portions than the above described layers.

Note that the above mentioned remarks are also applied to the following embodiments.

Embodiment 2

Meanwhile, the air permeability of the vehicular undercover 1 can be 0.05 to 70 cc/cm²/sec. When the air permeability is 0.05 cc/cm²/sec or more, the air permeability of the vehicular undercover 1 increases. Thus, further excellent sound absorption property can be obtained in the range of approximately 500 to 2000 Hz. When the air permeability is 70 cc/cm²/sec or less, the peak frequency of the sound absorption characteristic of the vehicular undercover 1 is approximately 2000 Hz or less. Thus, further excellent sound absorption property can be obtained in the range of approximately 500 to 2000 Hz. Accordingly, the present embodiment can provide the vehicular undercover having further excellent sound absorption property.

Here, the air permeability is based on the A method (fragile form method) defined in JIS L1096: 2010 (Testing methods for woven and knitted fabrics). Note that the above mentioned remark is also applied to the following embodiments.

Embodiment 3

In addition, the weight per unit area of the vehicular undercover 1 can be 560 to 3600 g/m². Since the weight per unit area is 3600 g/m² or less, the vehicular undercover 1 is lightweight. When the weight per unit area is 560 g/m² or more, further excellent durability can be obtained against the contact of foreign matters. Accordingly, the present embodiment can provide the suitable vehicular undercover having lightness yet excellent durability and excellent sound absorption property.

Embodiment 4

Furthermore, the weight per unit area of the outer layer 20 can be 50 to 400 g/m². The weight per unit area of the synthetic resin layer 30 can be 10 to 200 g/m² within the range smaller than the weight per unit area of the outer layer 20. Since the weight per unit area of the outer layer 20 is 400 g/m² or less and the weight per unit area of the synthetic resin layer 30 is 200 g/m² or less, the vehicular undercover 1 is lightweight. When the weight per unit area of the synthetic resin layer 30 is 10 g/m² or more, the air permeability of the vehicular undercover 1 can be suppressed to some extent. Thus, further excellent sound absorption property can be obtained in the range of approximately 500 to 2000 Hz. When the weight per unit area of the outer layer 20 is 50 g/m² or more, further excellent durability can be obtained against the contact of foreign matters. Accordingly, the present embodiment can provide the suitable vehicular undercover having lightness yet excellent durability and excellent sound absorption property.

(2) CONCRETE EXAMPLE OF CONFIGURATION OF AUTOMOBILE HAVING VEHICULAR UNDERCOVER

Figure 2:
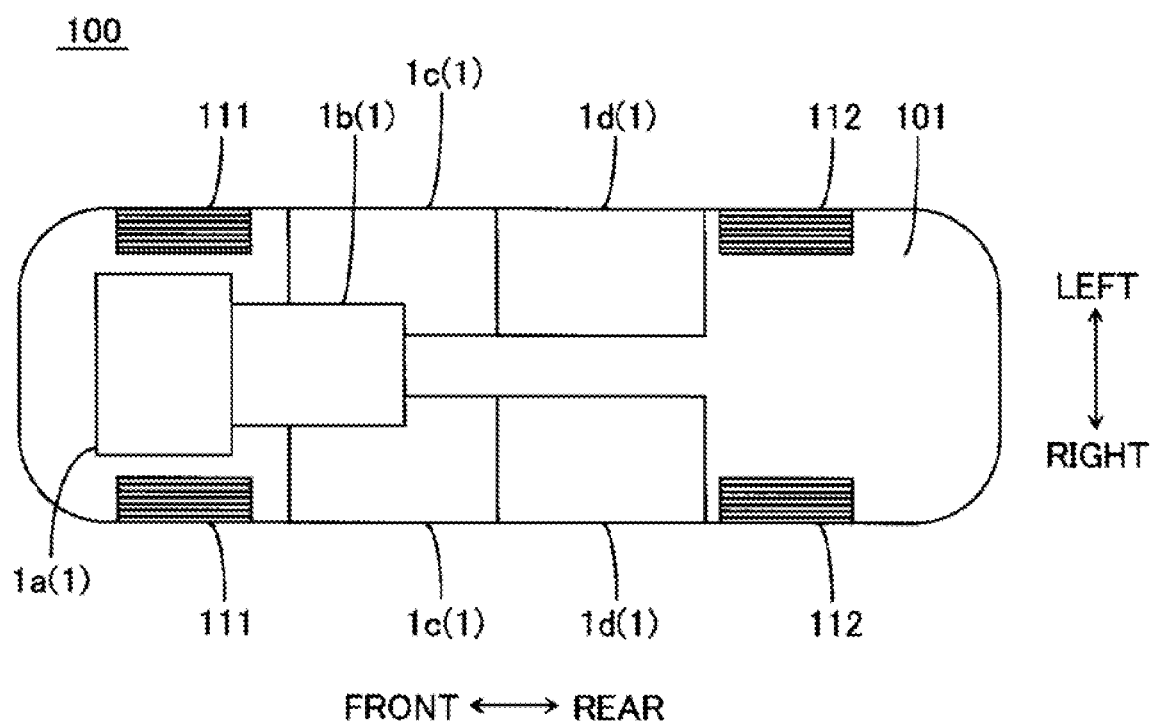
FIG. 2 is a bottom view schematically showing an example of the automobile having the undercover.

FIGS. 1 and 2 schematically show an example of an automobile having an undercover. An automobile 100 shown in FIGS. 1 and 2 is a road vehicle designed and equipped for running on the road. The automobile 100 is a passenger automobile having a vehicle compartment CA1 surrounded by a vehicle body 101. In the figures, FRONT, REAR, LEFT, RIGHT, UP and DOWN respectively represent the front, rear, left, right, up and down side of the automobile. Positional relation of the left and right is based on a direction of viewing the front when seated on a driver's seat in the vehicle compartment CA1. In the automobile 100 shown in FIG. 1, tires 111 of the front wheels and tires 112 of the rear wheels are in contact with a road surface 200.

A vehicular undercover 1 is attached under the vehicle body 101 so as not to come into contact with the road surface 200. The undercover 1 has a function of reducing air resistance (improving fuel efficiency) under the vehicle body 101 when the vehicle is running, a function of protecting the vehicle body 101 from foreign matters such as flipped stones or the like when the vehicle is running, and a function of absorbing and insulating sound to improve silence of the vehicle compartment CA1.

The undercover 1 shown in FIG. 2 is divided into a plurality of undercovers 1a, 1b, 1c, 1c, 1d and 1d. An engine undercover 1a is arranged under an engine of the automobile 100 between the tires 111, 111 of the left and right front wheels. A mission cover 1b is arranged under a speed changer (transmission) of the automobile 100 on the rear side of the engine undercover 1a. Left and right front floor undercovers 1c, 1c are arranged under a floor panel of the automobile 100 on the rear side of the tires 111, 111 of the front wheels. Left and right rear floor undercovers 1d, 1d are arranged under the floor panel of the automobile 100 on the front side of the tires 112, 112 of the rear wheels and the rear side of the front floor undercovers 1c, 1c.

Figure 3:
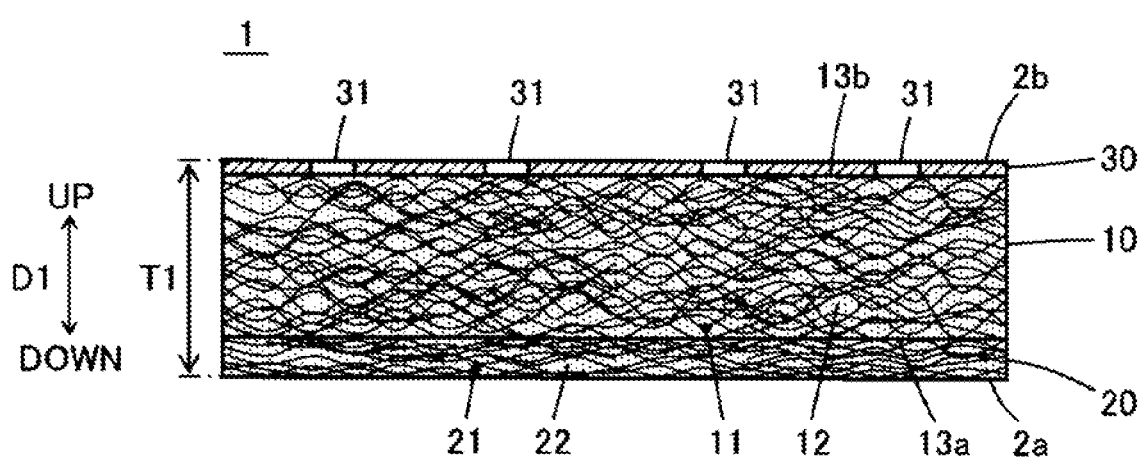
FIG. 3 is a cross-sectional view schematically showing an example of a vertical cross-section of the undercover.
Figure 4:
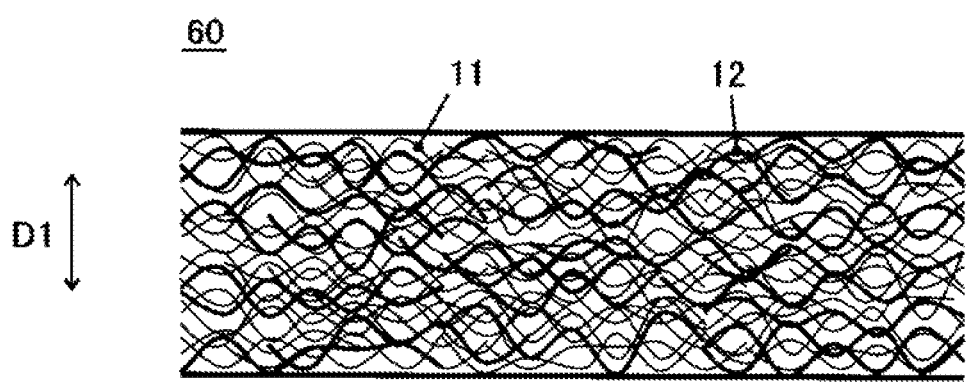
FIG. 4 is a cross-sectional view schematically showing an example of a vertical cross-section of a fiber material.
Figure 5:
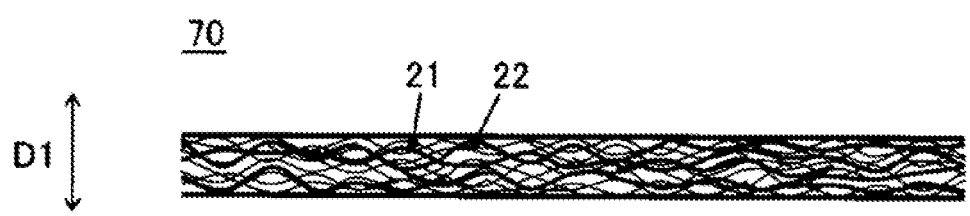
FIG. 5 is a cross-sectional view schematically showing an example of a vertical cross-section of a skin material.

FIG. 3 schematically shows an example of a vertical cross-section of the undercover 1. FIG. 4 schematically shows an example of a vertical cross-section of a fiber material 60 for forming a base material layer 10. FIG. 5 schematically shows an example of a vertical cross-section of a skin material 70 for forming an outer layer 20. The cross-sections of the examples shown in FIGS. 3 to 5 are exaggeratedly shown to make the explanation easier. A reference letter D1 shown in FIGS. 3 to 5 is a thickness direction of the undercover 1, a thickness direction of the layers 10, 20 and 30, a thickness direction of the fiber material 60, and a thickness direction of the skin material 70.

The press-molded base material layer 10 contains the inorganic fibers 11 and the solidified thermoplastic binder 12. In FIG. 3, the inorganic fibers 11 are shown by thin lines and the solidified thermoplastic binder 12 is formed around the inorganic fibers 11. Since the base material layer 10 has air permeability, air can flow in the thickness direction D1. Here, having air permeability means that the air permeability is 0.05 cc/cm$^2$/sec or more (more preferably 1 cc/cm$^2$/sec or more, further more preferably 3 cc/cm$^2$/sec or more). The base material layer 10 contains air between the inorganic fiber 11 and the thermoplastic binder 12. Thus, sound absorption property can be obtained.

On a road side surface 2a of the press-molded undercover 1, an outer layer 20 containing the synthetic resin fibers 21 and the solidified thermoplastic binder 22 is formed. In FIG. 3, the synthetic resin fibers 21 are shown by thin lines and the solidified thermoplastic binder 22 is formed around the synthetic resin fibers 21. The outer layer 20 shown in FIG. 3 is integrated with the road side surface 13a of the base material layer 10 by adhesion. In many cases, unevenness is formed on the road side surface 2a of the undercover 1. Since the outer layer 20 has air permeability, air can flow in the thickness direction D1. The outer layer 20 contains air between the synthetic resin fibers 21 and the thermoplastic binder 22. Thus, sound absorption property can be obtained. The sound flowing from the road side surface 2a through the outer layer 20 is absorbed by the base material layer 10. In addition, since the outer layer 20 is provided on the road side surface 2a of the undercover 1, durability can be obtained against the contact of foreign matters such as stones.

The synthetic resin layer 30 having a plurality of openings 31 is formed on a surface 2b of the vehicle body 101 side of the press-molded undercover 1. The synthetic resin layer 30 is integrated with the vehicle body side surface 13b of the base material layer 10. In many cases, unevenness is formed on the vehicle body side surface 2b of the undercover 1. Since the synthetic resin layer 30 has air permeability by the plurality of openings 31, air can flow in the thickness direction D1. The sound flowing from the vehicle body side surface 2b through the synthetic resin layer 30 is absorbed by the base material layer 10. In addition, since the synthetic resin layer 30 is provided on the vehicle body side surface 2b of the undercover 1, lightness yet excellent durability can be obtained in the vehicle body side surface 2b of the undercover 1.

From the viewpoint of the sound absorption property, equivalent performance can be obtained even when the layer containing the synthetic resin fibers 21 and the thermoplastic binder 22 is formed on the vehicle body side surface 13b of the base material layer 10 and the synthetic resin layer is formed on the road side surface 13a of the base material layer 10.

However, the undercover in which the outer layer 20 and the synthetic resin layer 30 are reversely arranged is inferior to the undercover 1 which is the present concrete example in respect of durability against the contact of foreign matters such as stones.

Hereafter, the details of the layers 10, 20 and 30 will be explained. In the following explanation, MFR is based on the MFR defined in JIS K7210-1: 2014 (Plastics-Determination of the melt mass-flow rate (MFR) and melt volume-flow rate (MVR) of thermoplastics-Part 1: Standard method). In addition, arithmetical mean roughness is an average value of absolute values of deviation from the center line of a roughness curve. Specifically, the arithmetic mean roughness is based on the arithmetical mean roughness Ra defined in JIS B0601: 2013 (Geometrical Product Specifications (GPS)-Surface texture: Profile method-Terms, definitions and surface texture parameters).

The inorganic fibers 11 of the base material layer 10 are fibers mainly containing inorganic substance. The inorganic fibers 11 are materials which keep the state of the fibers without being melted even when the fiber material 60 is heated. Hence, the inorganic fibers 11 of the fiber material 60 are kept remained even after press molding. For the inorganic fibers, glass fibers, carbon fibers, silicon carbide fibers, alumina fibers, ceramic fibers, rock fibers and slug fibers can be used, for example. In particular, relatively inexpensive glass fibers are suitable. A diameter of the inorganic fiber is not particularly limited. For example, the diameter can be 5 to 14 μm. A length of the inorganic fiber is not particularly limited. For example, the length can be 5 to 200 mm. A cross-sectional shape of the inorganic fiber is not particularly limited. For example, the cross-sectional shape can be elliptic including circular, triangular, flat or the like. A plurality of kinds of inorganic fibers can be combined for the inorganic fiber 11.

The thermoplastic binder 12 of the base material layer 10 is a binder mainly containing thermoplastic adhesive components such as a thermoplastic resin. The thermoplastic binder 12 is softened when the fiber material 60 is heated and melted when the fiber material 60 is further heated. The thermoplastic binder 12 is melted to adhere the inorganic fibers 11 with each other and adhere the base material layer 10 with the outer layer 20, and adhere the base material layer 10 with the synthetic resin layer 30. For the thermoplastic resin (including thermoplastic elastomer) of the thermoplastic binder, polyolefin resins such as a polypropylene (PP) resin and a polyethylene (PE) resin, modified resins obtained by adding elastomer to the above described synthetic resins, materials obtained by adding additives such as a colorant to the above described synthetic resins can be used, for example. In particular, a relatively inexpensive PP resin is suitable. A plurality of kinds of thermoplastic binders can be combined for the thermoplastic binder 12.

The thermoplastic binder 12 of the fiber material 60 for forming the base material layer 10 can be thermoplastic adhesive fibers such as thermoplastic resin fibers. Hence, the fibrous thermoplastic binder 12 of the fiber material 60 may be melted and become non-fibrous after press molding. For the adhesive fibers, the above described fibers of the thermoplastic resin (e.g., polyolefin resins such as a PP resin and a PE resin) can be used, for example. Fibers having a conjugate structure such as a core-sheath structure and a side-by-side structure can be also used, for example. A plurality of kinds of adhesive fibers can be combined. A melting point of the adhesive fiber can be 100 to 220° C., for example. A fineness of the adhesive fiber is not particularly limited. The fineness can be 2.2 to 16 dtex (decitex), for example. Here, the unit "dtex" means a weight in grams per unit length 10 km. A length of the adhesive fiber is not particularly limited. The length can be 27 to 76 mm, for example. A cross-sectional shape of the adhesive fiber is not particularly limited. For example, the cross-sectional shape can be elliptic including circular, triangular, flat or the like. Since the fiber material 60 has air permeability, air can flow in the thickness direction D1.

Even when the thermoplastic binders 12 of the fiber material 60 are not fibrous, the undercover having the binders is also included in the present technology.

A compounding ratio (hereafter referred to as R1) of the inorganic fibers 11 with respect to the fiber material 60 (i.e., base material layer 10) can be 10 to 90 wt. %, for example. A compounding ratio (hereafter referred to as R2) of the thermoplastic binders 12 with respect to the fiber material 60 can be 10 to 90 wt. %, for example. However, the following relation is satisfied.

$$R1+R2 \leq 100 \ wt. \ \%$$

Other materials (e.g., fibers) can be added to the fiber material 60 as long as the compounding ratio is within the range of equal to or lower than R1+R2 (preferably R1+R2≥75 wt. %).

The weight per unit area of the fiber material 60 (i.e., base material layer 10) is preferably about 500 to 3000 g/m². When the weight per unit area of the fiber material 60 is 3000 g/m² or less, the weight of the undercover 1 can be preferably reduced. When the weight per unit area of the fiber material 60 is 500 g/m² or more, the undercover 1 having a preferable durability against the contact of foreign matters can be manufactured. The fiber material 60 can be a needle-punched material. In this case, the fiber material 60 can be formed, for example, by mixing the inorganic fibers 11 and the fiber material containing the fibrous thermoplastic binder 12, arranging the mixture in a mat-shape, and needle-punching it by a needle punching processing machine. When the undercover 1 is formed by using the needle-punched fiber material 60, a needle-punched mark 15 exemplified in FIG. 6A remains on the cross-sectional surface of the base material layer 10. In the base material layer 10 having the needle-punched mark 15, the outer layer 20 is integrated with the road side surface 13a and the synthetic resin layer 30 having the plurality of openings 31 is integrated with the vehicle body side surface 13b.

In addition, the fiber material 60 can be the material in which a plurality of needle-punched fiber materials are stacked as shown in Japanese Patent Application Publication No. 2018-69813. For example, when the undercover 1 is formed by using the fiber material 60 in which two needle-punched fiber materials are stacked, the outer layer 20, the needle-punched first base material layer 10a, the needle-punched second base material layer 10b and the synthetic resin layer 30 are formed in this order from the road surface to the vehicle body as exemplified in FIG. 6B. The first base material layer 10a and the second base material layer 10b are included in the base material layer 10. The first base material layer 10a and the second base material layer 10b can have needle-punched marks 15 and can be adhered with each other in a state that a weak layer 10z is formed between the first base material layer 10a and the second base material layer 10b. The weak layer 10z means a layer that is peeled off when the undercover 1 is pulled in the thickness direction D1. Of course, the outer layer 20 is integrated with the road side surface 13a of the first base material layer 10a and the synthetic resin layer 30 having the plurality of openings 31 is integrated with the vehicle body side surface 13b of the second base material layer 10b.

The air permeability of the base material layer 10 is preferably about 3 to 200 cc/cm²/sec. When the air permeability of the base material layer 10 is 3 cc/cm²/sec or more, the air permeability of the undercover 1 is increased. Thus, further excellent sound absorption property can be obtained in the range of approximately 500 to 2000 Hz. When the air permeability of the base material layer 10 is 200 cc/cm²/sec or less, the peak frequency of the sound absorption characteristic of the vehicular undercover 1 is approximately 2000 Hz or less. Thus, further excellent sound absorption property can be obtained in the range of approximately 500 to 2000 Hz.

The air permeability of the base material layer 10 can be adjusted as follows, for example. The air permeability of the base material layer 10 can be increased by reducing the compounding ratio R2 of the thermoplastic binder 12 with respect to the fiber material 60 or reducing the weight per unit area of the fiber material 60. The air permeability of the base material layer 10 can be reduced by increasing the compounding ratio R2 of the thermoplastic binder 12 with respect to the fiber material 60 or increasing the weight per unit area of the fiber material 60.

The synthetic resin fibers 21 of the outer layer 20 are fibers mainly containing synthetic resins such as a thermoplastic resin. When the synthetic resin fibers 21 are thermoplastic, a melting point of the synthetic resin fibers is preferably higher than a melting point of the thermoplastic binder 22. The synthetic resin fibers 21 having high melting point keep the state of the fibers. Thus, perforation and peeling of the outer layer 20 are prevented. For the thermoplastic resin (including thermoplastic elastomer) of the synthetic resin fibers 21, polyester resins such as a polyethylene terephthalate (PET) resin, polyolefin resins such as a polyamide (PA) resin, an acrylic (PMMA) resin and a PP resin, modified resins obtained by adding elastomer to the above described synthetic resins, materials obtained by adding additives such as a colorant to the above described synthetic resins can be used, for example. In particular, relatively inexpensive PET fibers are suitable. Fibers having a conjugate structure can be also used for the synthetic resin fibers 21. A fineness of the synthetic resin fibers is not particularly limited. The fineness can be 2.2 to 16 dtex, for example. A length of the synthetic resin fibers is not particularly limited. The length can be 27 to 76 mm, for example. A cross-sectional shape of the synthetic resin fibers is not particularly limited. For example, the cross-sectional shape can be elliptic including circular, triangular, flat or the like. A plurality of kinds of synthetic resin fibers can be combined for the synthetic resin fibers 21.

The thermoplastic binder 22 of the outer layer 20 is a binder mainly containing thermoplastic adhesive components such as a thermoplastic resin. The thermoplastic binder 22 is softened when the skin material 70 for forming the outer layer 20 is heated and melted when the skin material 70 is further heated. The thermoplastic binder 22 is melted to form a smooth surface. Thus, ice accretion resistance is improved. In addition, the thermoplastic binder 22 is melted to adhere the synthetic resin fibers 21 with each other and adhere the outer layer 20 with the base material layer 10.

Consequently, the thermoplastic binder 22 increases the chipping resistance (peeling prevention strength). For the thermoplastic resin (including thermoplastic elastomer) of the thermoplastic binder, polyolefin resins such as a PP resin and a PE resin, modified resins obtained by adding elastomer to the above described synthetic resins, materials obtained by adding additives such as a colorant to the above described synthetic resins can be used, for example. In particular, a relatively inexpensive PP resin is suitable. A plurality of kinds of thermoplastic binders can be combined for the thermoplastic binder 12.

The thermoplastic binder 22 of the skin material 70 for forming the outer layer 20 can be thermoplastic adhesive fibers such as thermoplastic resin fibers. Hence, the fibrous thermoplastic binder 22 of the skin material 70 may be melted and become non-fibrous after press molding. For the adhesive fibers, the above described fibers of the thermoplastic resin (e.g., polyolefin resins such as a PP resin and a PE resin) can be used, for example. Fibers having a conjugate structure can be also used. A plurality of kinds of adhesive fibers can be combined. A melting point of the adhesive fibers can be 100 to 220° C., for example. A fineness of the adhesive fiber is not particularly limited. The fineness can be 2.2 to 16 dtex, for example. A length of the adhesive fiber is not particularly limited. The length can be 27 to 76 mm, for example. A cross-sectional shape of the adhesive fiber is not particularly limited. For example, the cross-sectional shape can be elliptic including circular, triangular, flat or the like. Since the skin material 70 has air permeability, air can flow in the thickness direction D1. Even when the thermoplastic binder 22 of the skin material 70 is not fibrous, the undercover having the binder is also included in the present technology.

A compounding ratio (hereafter referred to as R3) of the synthetic resin fibers 21 with respect to the skin material 70 (i.e., outer layer 20) can be 10 to 90 wt. %, for example. A compounding ratio (hereafter referred to as R4) of the thermoplastic binder 22 with respect to the skin material 70 can be 10 to 90 wt. %, for example. However, the following relation is satisfied.

$R3+R4 \leq 100$ wt. %

Other materials (e.g., fibers) can be added to the skin material 70 as long as the compounding ratio is within the range of equal to or lower than R3+R4 (more preferably R3+R4≥75 wt. %).

The weight per unit area of the skin material 70 (i.e., outer layer 20) is preferably 50 to 400 g/m². When the weight per unit area of the skin material 70 is 400 g/m² or less, the weight of the undercover 1 can be preferably reduced. When the weight per unit area of the skin material 70 is 50 g/m² or more, the undercover 1 having a preferable durability against the contact of foreign matters can be manufactured. The skin material 70 can be a needle-punched material. In this case, the skin material 70 can be formed, for example, by mixing the synthetic resin fibers 21 and the fiber material containing the fibrous thermoplastic binder 22, arranging the mixture in a mat-shape, and needle-punching it by a needle punching processing machine.

The air permeability of the outer layer 20 is preferably about 0.1 to 200 cc/cm²/sec. When the air permeability of the outer layer 20 is 0.1 cc/cm²/sec or more, the air permeability of the undercover 1 is increased. Thus, further excellent sound absorption property can be obtained in the range of approximately 500 to 2000 Hz. When the air permeability of the outer layer 20 is 200 cc/cm²/sec or less, the peak frequency of the sound absorption characteristic of the vehicular undercover 1 is approximately 2000 Hz or less. Thus, further excellent sound absorption property can be obtained in the range of approximately 500 to 2000 Hz.

The air permeability of the outer layer 20 can be adjusted as follows, for example. The air permeability of the outer layer 20 can be increased by reducing the compounding ratio R4 of the thermoplastic binder 22 with respect to the skin material 70 or reducing the weight per unit area of the skin material 70. The air permeability of the outer layer 20 can be reduced by increasing the compounding ratio R4 of the thermoplastic binder 22 with respect to the skin material 70 or increasing the weight per unit area of the skin material 70.

A synthetic resin film 80 (shown in FIG. 7) for forming the synthetic resin layer 30 is a film mainly containing synthetic resins such as a thermoplastic resin. For the thermoplastic resin (including thermoplastic elastomer) of the synthetic resin film 80, polyolefin resins such as a PE resin and a PP resin, ethylene-vinyl acetate resin, modified resins obtained by adding elastomer to the above described synthetic resins, materials obtained by adding additives such as a colorant to the above described synthetic resins can be used, for example. In particular, polyolefin resin having low fluidity is suitable (e.g., linear low-density polyethylene (LLDPE)). The MFR of the thermoplastic resin can be approximately 0.1 to 30 g/10 min, for example. More preferably, the MFR can be approximately 0.3 to 20 g/10 min.

The openings 31 of the synthetic resin layer 30 can be formed when the synthetic resin film 80 stacked on the fiber material 60 is melted. Otherwise, the openings 31 can come from the openings formed on the synthetic resin film 80.

A weight per unit area of the synthetic resin film 80 (i.e., synthetic resin layer 30) is preferably 10 to 200 g/m², more preferably 30 to 100 g/m² within the range smaller than the weight per unit area of the skin material 70 (i.e., outer layer 20). When the weight per unit area of the synthetic resin film 80 is 200 g/m² or less, the weight of the undercover 1 can be preferably reduced. When the weight per unit area of the synthetic resin film 80 is 10 g/m² or more, the air permeability of the vehicular undercover 1 can be suppressed to some extent. Thus, further excellent sound absorption property can be obtained in the range of approximately 500 to 2000 Hz.

A thickness of the synthetic resin film 80 (i.e., synthetic resin layer 30) is preferably 10 to 200 μm, more preferably 30 to 100 μm. When the thickness of the synthetic resin film 80 is 200 μm or less, the weight of the undercover 1 can be preferably reduced. When the thickness of the synthetic resin film 80 is 10 μm or more, the air permeability of the vehicular undercover 1 can be suppressed to some extent. Thus, further excellent sound absorption property can be obtained in the range of approximately 500 to 2000 Hz.

An air permeability of the synthetic resin layer 30 is preferably about 0.1 to 200 cc/cm²/sec. When the air permeability of the synthetic resin layer 30 is 0.1 cc/cm²/sec or more, the air permeability of the undercover 1 is increased. Thus, further excellent sound absorption property can be obtained in the range of approximately 500 to 2000 Hz. When the air permeability of the synthetic resin layer 30 is 200 cc/cm²/sec or less, the peak frequency of the sound absorption characteristic of the vehicular undercover 1 is approximately 2000 Hz or less.

Thus, further excellent sound absorption property can be obtained in the range of approximately 500 to 2000 Hz.

The air permeability of the synthetic resin layer 30 can be adjusted as follows, for example. The air permeability of the synthetic resin layer 30 can be increased by increasing the MFR of the thermoplastic resin for the synthetic resin layer 30 or decreasing the weight per unit area of the synthetic resin film 80. Consequently, the openings 31 become relatively larger in the press-molded synthetic resin layer 30 to increase the air permeability of the synthetic resin layer 30. The air permeability of the synthetic resin layer 30 can be reduced by reducing the MFR of the thermoplastic resin for the synthetic resin layer 30 or increasing the weight per unit area of the synthetic resin film 80. Consequently, the openings 31 become relatively smaller in the press-molded synthetic resin layer 30 to decrease the air permeability of the synthetic resin layer 30.

The thickness (shown in FIG. 3 as a thickness T1 of a general portion) of the press-molded undercover 1 can be 1 to 17 mm, for example. The thickness T1 (shown in FIG. 6C) of the general portion 1G of the undercover 1 can be 3 to 17 mm, for example. The density of the press-molded undercover 1 can be, for example, 0.05 to 0.5 g/cm$^3$ (more preferably 0.1 to 0.3 g/cm$^3$).

The weight per unit area of the undercover 1 is preferably 560 to 3600 g/m$^2$. When the weight per unit area of the undercover 1 is 560 g/m$^2$ or more, the undercover 1 having a preferable durability against the contact of foreign matters can be manufactured. Accordingly, the undercover 1 having lightness that the weight per unit area is 3600 g/m$^2$ or less yet preferable durability can be obtained.

The air permeability of the undercover 1 is preferably 0.05 to 70 cc/cm$^2$/sec, more preferably 1 to 50 cc/cm$^2$/sec, further more preferably 2 to 30 cc/cm$^2$/sec, and particularly preferably 3 to 15 cc/cm$^2$/sec. When the air permeability of the undercover 1 is 0.05 cc/cm$^2$/sec or more, further excellent sound absorption property can be obtained in the range of approximately 500 to 2000 Hz. When the air permeability is 70 cc/cm$^2$/sec or less, the peak frequency of the sound absorption characteristic of the vehicular undercover 1 is approximately 2000 Hz or less. Thus, further excellent sound absorption property can be obtained in the range of approximately 500 to 2000 Hz.

Figure 6A:
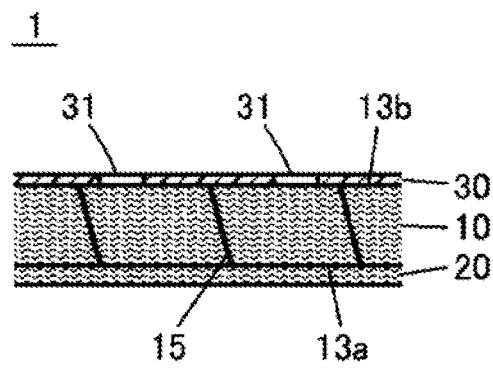
FIGS. 6A to 6C are cross-sectional views schematically showing examples of vertical cross-sections of other undercovers.
Figure 6B:
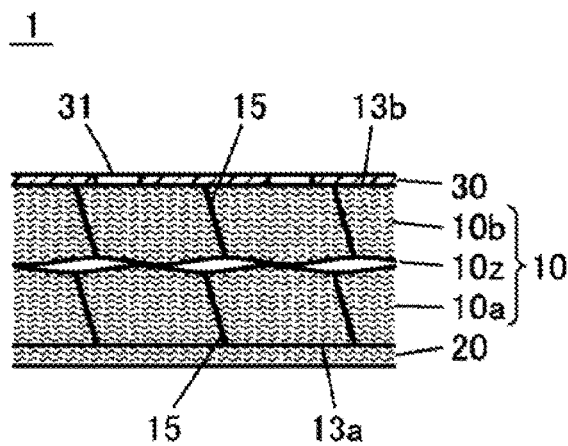
Figure 6C:
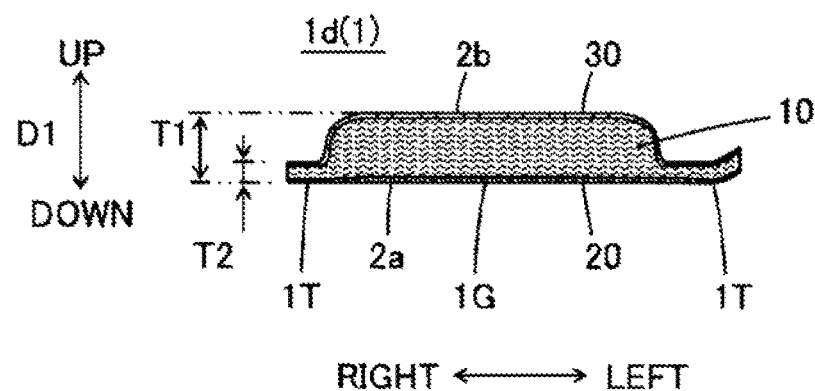

As shown in FIG. 6C, the thickness of the press-molded undercover 1 can be partly different. FIG. 6C schematically shows a vertical end of the undercover 1 using the rear floor undercovers 1d of the left side as an example. The undercover 1 shown in FIG. 6C includes a thickness-reduced portion 1T configured to be partly thinned and a general portion 1G formed around the thickness-reduced portion 1T. Namely, the thickness T2 of the thickness-reduced portion 1T is smaller than the thickness T1 of the general portion 1G which occupies a large portion of the undercover 1. In the undercover 1, the thickness-reduced portion 1T is located at the position easily sandwiched between vehicle components and an obstacle such as a curbstone or the like when the vehicle runs on the obstacle. For example, the thickness-reduced portion 1T is located on a terminal portion and a fastening portion fastened to the vehicle components. The thickness T2 of the thickness-reduced portion 1T can be specified within the range thinner than the thickness T1 of the general portion 1G The thickness T2 can be 1 to 3 mm, for example.

In addition, the arithmetic mean roughness Ra(T) of the road side surface 2a of the thickness-reduced portion 1T is smaller than the arithmetic mean roughness Ra(G) of the road side surface 2a of the general portion 1G Consequently, on the road side surface 2a of the undercover 1, the thickness-reduced portion 1T has higher glossiness of the synthetic resin than the general portion 1G; has smaller dynamic friction force against the contact of the obstacle such as a curbstone or the like, and is hard to be torn off when sandwiched between the vehicle components and the obstacle. The arithmetic mean roughness Ra(G) of the road side surface 2a of the general portion 1G can be 1.5 to 5 μm, for example. The arithmetic mean roughness Ra(T) of the road side surface 2a of the thickness-reduced portion 1T can be specified within the range smaller than Ra(G). The arithmetic mean roughness Ra(T) can be 0.5 to 1.5 μm, for example.

(3) CONCRETE EXAMPLE OF MANUFACTURING METHOD OF VEHICULAR UNDERCOVER, OPERATION AND EFFECT

Next, with reference to FIG. 7 and other figures, an example of the manufacturing method of the undercover 1 will be explained.

Figure 7:
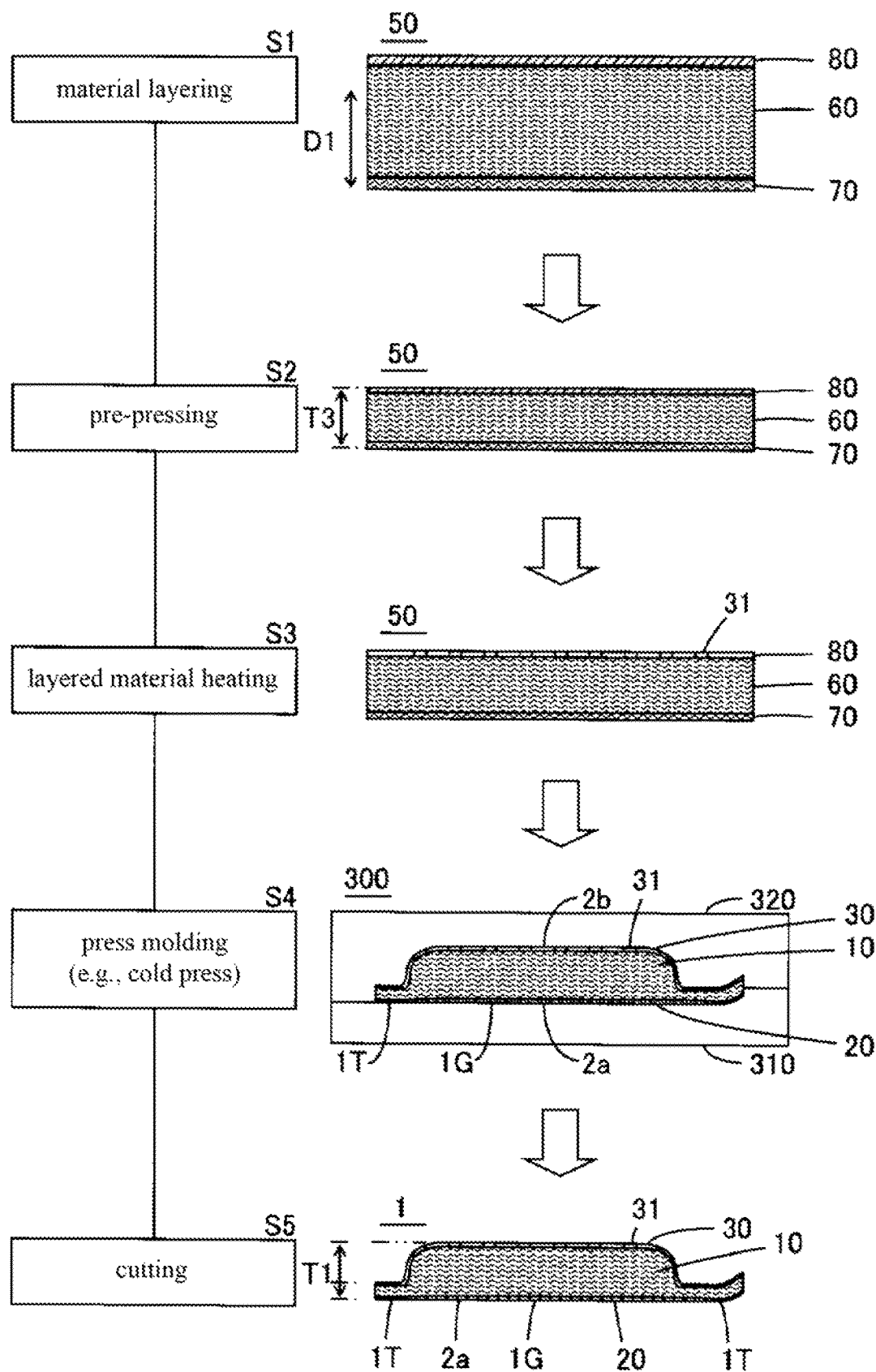
FIG. 7 is a drawing schematically showing an example of a manufacturing method of the undercover.

FIG. 7 shows a concrete example of manufacturing the undercover 1 having the layers 20, 10 and 30 shown in FIG. 3. In the manufacturing method shown in FIG. 7, first of all, the skin material 70, the fiber material 60 and the synthetic resin film 80 for respectively forming layers 20, 10 and 30 are sequentially stacked (material layering step S1). The skin material 70 can be formed by cutting the synthetic resin fibers 21 and the fiber material containing the fibrous thermoplastic binder 22, arranging them in a sheet-shape, and needle-punching them by a needle punching processing machine. The fiber material 60 can be formed by cutting the inorganic fibers 11 and the fiber material containing the fibrous thermoplastic binder 12, arranging them in a mat-shape, and needle-punching them by a needle punching processing machine. The synthetic resin film 80 can be formed on the surface of the fiber material 60 (the vehicle body side surface 13b) by extrusion-molding the molten or liquefied synthetic resin into a film shape from a T-die (flat die) of an extruder.

In the present concrete example, the layered material 50 obtained by the material layering step S1 is heated by a pre-heating device to above the melting points of the thermoplastic binders 12, 22 and the synthetic resin film 80 and pressed by a pre-pressing device in the thickness direction D1 (pre-pressing step S2). Consequently, at least a part of the thermoplastic binders 12, 22 and the synthetic resin film 80 is once melted to adhere the materials 70, 60 and 80 to each other. Thus, the layered material 50 is integrated and easily operable. In addition, the openings 31 may be formed when at least a part of the synthetic resin film 80 is impregnated into the surface of the fiber material 60. When the temperature of the integrated layered material 50 is reduced lower than the softening temperature of the thermoplastic binders 12, 22 and the synthetic resin film 80, the thermoplastic binders 12, 22 and the synthetic resin film 80 are solidified. Thus, the layered material 50 is kept in a state that it is integrated. Here, a thickness of the integrated layered material 50 is referred to as T3. The thickness T3 of the layered material 50 with respect to the thickness T1 of the general portion 1G can be targeted to the following formula, for example.

$$0.5 \times T1 \leq T3 \leq 1.5 \times T1$$

Then, the integrated layered material 50 is heated by a heating device to above the melting point of the thermoplastic binders 12, 22 and the synthetic resin film 80 (layered material heating step S3). Consequently, at least a part of the thermoplastic binders 12, 22 and the synthetic resin film 80 is melted, and the fiber material 60 starts to expand in the thickness direction D1 by a restoring force of the inorganic fibers 11 of the fiber material 60 compressed in the thickness direction D1. When the fiber material 60 is needle-punched, the restoration of the thickness is limited. In addition, the openings 31 may be formed when at least a part of the synthetic resin film 80 is impregnated into the surface of the fiber material 60. The heating of the step S3 and the pre-heating step S2 can be a radiation heating performed by an infrared radiation heater, a hot air heating performed by a suction heater (hot air circulation heater), a contact heating of hot press, or the combination of the above described heating methods, for example.

After the layered material heating step S3, the heated layered material 50 is press-molded by a press molding apparatus 300 (press molding step S4). The press molding apparatus 300 has a die 310 and a die 320. The die 310 forms the surface 2a having the unevenness of the road surface side of the undercover 1. The die 320 forms the surface 2b having the unevenness of the vehicle body 101 side of the undercover 1. Although the die 310 is a lower die and the die 320 is an upper die in FIG. 7, it is also possible to use the die 310 as an upper die and use the die 320 as a lower die. For the press-molding, cold press can be used but hot press can be also used. When the temperature of the undercover 1 becomes lower than the softening temperature of the thermoplastic binders 12, 22 and the synthetic resin film 80, the thermoplastic binders 12, 22 and the synthetic resin film 80 are solidified and the shape of the undercover 1 is maintained.

Here, since the density of the thermoplastic binders 12, 22 is high in the thickness-reduced portion 1T, a large amount of melted thermoplastic binder is leaked to the road side surface 2a and the surface 2b of the vehicle body 101 side. Consequently, the thickness-reduced portion 1T is smoother than the general portion 1G In addition, the arithmetic mean roughness Ra(T) of the road side surface 2a of the thickness-reduced portion 1T is smaller than the arithmetic mean roughness Ra(G) of the road side surface 2a of the general portion 1G As an outer appearance, the thickness-reduced portion 1T has higher glossiness of the synthetic resin than the general portion 1G.

Note that an outer periphery of the press molded article can be cut by a cutting machine if required (cutting step S5). As a method of cutting, a cutting by a cutting blade, a water jet cutting and a manual cutting using a cutter can be used, for example.

As explained above, the undercover 1 shown in FIG. 3 having the layers 20, 10 and 30 can be manufactured. Of course, the undercovers 1 shown in FIGS. 6A to 6C can be manufactured by the same manufacturing method.

In the undercover 1 of the present concrete example, since the synthetic resin fibers 21 are contained in the outer layer 20 of the road surface side, durability is excellent against the contact of foreign matters such as stones. Here, when the material containing the synthetic resin fibers and the solidified thermoplastic binder is used also for the layer of the vehicle body side of the vehicular undercover 1, the weight of the vehicular undercover increases by the weight of them. In the vehicular undercover 1 of the present concrete example, the layer of the vehicle body side is the synthetic resin layer 30 which has air permeability and is integrated with the vehicle body side surface 13b of the base material layer 10. Thus, the increase of the weight of the vehicular undercover 1 can be suppressed while the durability of the vehicular undercover 1 is maintained. In addition, since the synthetic resin layer 30 has air permeability, the undercover 1 of the present concrete example is excellent in the sound absorption property against the noise having the frequency of approximately of 500 to 2000 Hz. Accordingly, the undercover 1 of the present concrete example has lightness yet excellent durability against the contact of foreign matters such as stones and excellent sound absorption property.

(4) WORKING EXAMPLES

Hereafter, although the present invention will be explained concretely showing working examples, the present invention is not limited to the following examples.

Working Example 1

For the fiber material 60, a fiber material in which two needle-punched fiber materials (weight per unit area 550 g/m$^2$) were stacked were used, the fiber material containing glass fibers (example of the inorganic fibers 11) and a PP resin (example of the thermoplastic binder 12). For the skin material 70 of the road surface side, a nonwoven fabric (weight per unit area 200 g/m$^2$) containing PET fibers resin (example of the synthetic resin fibers 21) and PP fibers (example of the thermoplastic binder 22) was used. For the material of the synthetic resin film 80, the LLDPE was used.

The skin material 70 and the fiber material 60 (two-layered fiber materials) were sequentially stacked and the synthetic resin film 80 was stacked on the surface of the fiber material 60 by extrusion-molding the heated and molten LLDPE from a T-die of an extruder so that the weight per unit area became 80 g/m$^2$.

Then, according to the manufacturing method shown in FIG. 7, a sample of the undercover 1 having the layers 20, 10 and 30 shown in FIG. 6B was formed so that the thickness T1 became 7 mm. The air permeability of the obtained sample was 8.5 cc/cm$^2$/sec.

Comparative Example 1

A sample of the undercover having the outer layer 20 and the base material layer 10 without having the synthetic resin layer 30 was formed so that the configuration is same as Working example 1 except for that the synthetic resin film 80 is not stacked on the fiber material 60. The air permeability of the obtained sample was 16 cc/cm$^2$/sec.

[Evaluation of Sound Absorption Property]

For the samples of Working example 1 and Comparative example 1, an air layer of 10 mm was set on the vehicle body side, and the sound absorption coefficient in reverberation room was calculated with respect to the center frequency (Hz) in each ⅓ octave band according to the measurement method defined in JIS A1409: 1998 (Method for measurement of sound absorption coefficients in a reverberation room).

Figure 8:
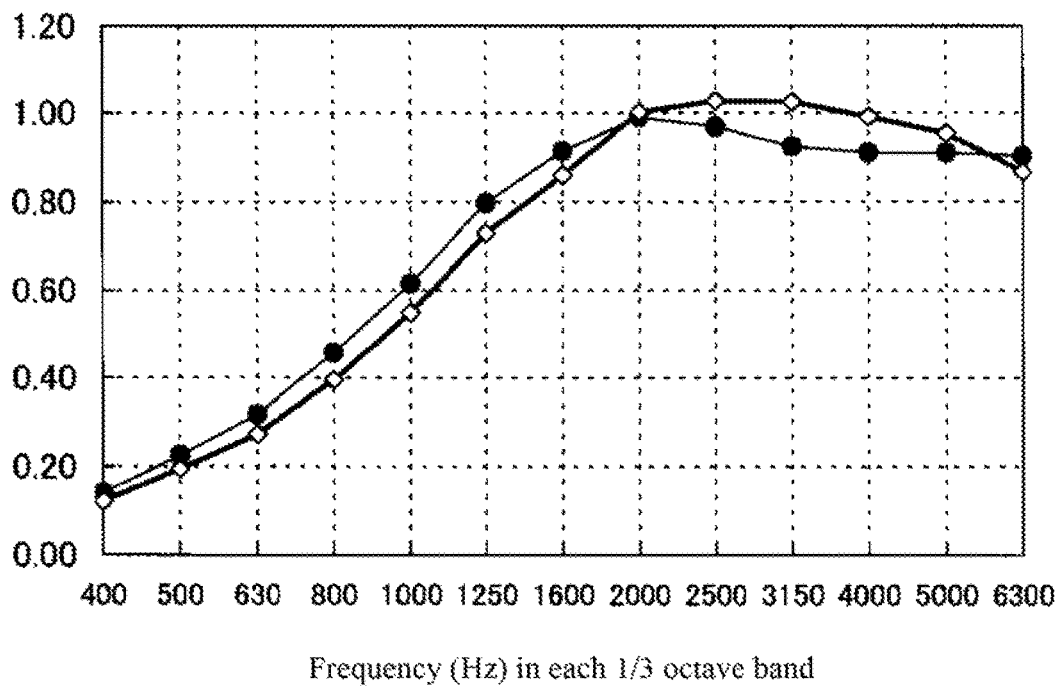
FIG. 8 is a drawing showing an example of the sound absorption coefficient of samples of the undercover in reverberation room with respect to the center frequency in each ⅓ octave band.

The result is shown in FIG. 8. FIG. 8 shows the measurement result of the sound absorption coefficient of Working example 1 and Comparative example 1 in reverberation room with respect to the center frequency (unit: Hz) in each ⅓ octave band of 400 to 6300 Hz by a graph. In the range of 500 to 2000 Hz, the sound absorption coefficient of Working example 1 in reverberation room was mostly higher than the sound absorption coefficient of Comparative example 1 in reverberation room. Accordingly, it was proved that the sound absorption property was improved against the noise having the frequency of approximately of 500 to 2000 Hz by providing the synthetic resin layer 30 on the vehicle body side. Of course, the sample of the undercover of Working example 1 was excellent in durability against the contact of foreign matters by providing the outer layer 20 containing the synthetic resin fibers 21 and the thermoplastic binder 22 on the road surface side. In addition, the weight was reduced by providing the synthetic resin layer 30 on the vehicle body side instead of providing the layer containing the synthetic resin fibers and the thermoplastic binder.

Working Example 2

Six samples of the undercovers having different air permeability within the range of 4.8 to 11.1 cc/cm$^2$/sec were prepared by adjusting the weight per unit area of the material and the thickness T1 of the samples. Each sample of the test sections 1-6 has the layers 20, 10 and 30 as shown in FIG. 6B. Here, the relation between the test sections and the air permeability of the samples is as follows.
 Test section 1: 4.8 cc/cm$^2$/sec
 Test section 2: 6.6 cc/cm$^2$/sec
 Test section 3: 7.5 cc/cm$^2$/sec
 Test section 4: 7.6 cc/cm$^2$/sec
 Test section 5: 8.5 cc/cm$^2$/sec
 Test section 6: 11.1 cc/cm$^2$/sec Note that the sample of Test section 5 is same as the sample of Working example 1.

Figure 9:
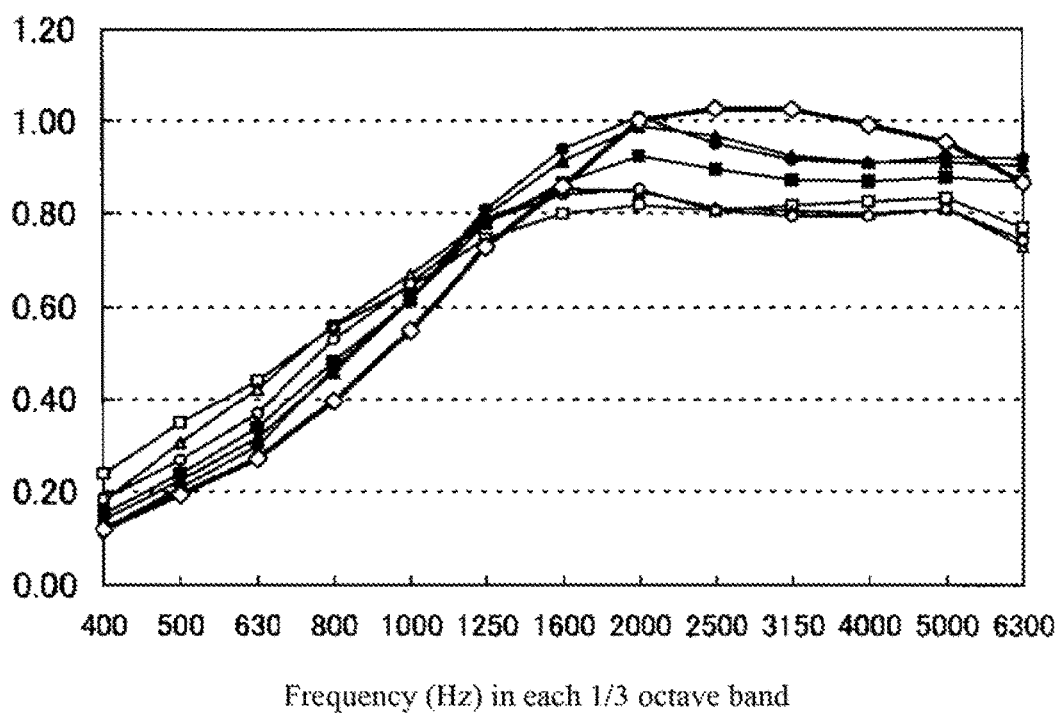
FIG. 9 is a drawing showing an example of the sound absorption coefficient of samples of the undercover in reverberation room with respect to the center frequency in each ⅓ octave band.

For Test sections 1 to 6, an air layer of 10 mm was set on the vehicle body side, and the above described sound absorption coefficient in reverberation room was calculated. The result is shown in FIG. 9. FIG. 9 shows the measurement result of the sound absorption coefficient of Test sections 1 to 6 of Working example 2 and Comparative example 1 in reverberation room with respect to the center frequency (unit: Hz) in each ⅓ octave band of 400 to 6300 Hz by a graph. In the range of 500 to 2000 Hz, the sound absorption coefficient of Test sections 1 to 6 of Working example 2 in reverberation room was mostly higher than the sound absorption coefficient of Comparative example 1 in reverberation room. Accordingly, even when the air permeability was changed, it was proved that the sound absorption property was improved against the noise having the frequency of approximately of 500 to 2000 Hz by providing the synthetic resin layer 30. Of course, the samples of the undercovers of Test sections 1 to 6 of Working example 2 were excellent in durability against the contact of foreign matters by providing the outer layer 20 containing the synthetic resin fibers 21 and the thermoplastic binder 22 on the road surface side. In addition, the weight was reduced by providing the synthetic resin layer 30 on the vehicle body side instead of providing the layer containing the synthetic resin fibers and the thermoplastic binder.

(5) VARIATION EXAMPLES

Various variation examples are conceivable in the present invention.

For example, when a plurality of fiber materials are stacked as the fiber material 60, at least one of the kind of the inorganic fibers 11 and the kind of the thermoplastic binder 12 can be different between one fiber material and the other fiber material. Namely, when the base material layer 10 contains a plurality of layers, at least one of the inorganic fibers 11 and the thermoplastic binder 12 can be different between one layer and the other layer.

(6) CONCLUSION

As explained above, various embodiments of the present invention can provide a technology of the vehicular undercover having lightness yet excellent durability against the contact of foreign matters and excellent sound absorption property, for example. Of course, the above-described basic operation and effect can be obtained even with only the components described in the independent claims.

The present invention can be also implemented by replacing the features disclosed in the above-described examples with each other or changing the combinations thereof, and the present invention can be also implemented by replacing the conventional features and the features disclosed in the above-described examples with each other or changing the combinations thereof. The present invention includes these features and the like.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. An integrally molded vehicular undercover having air permeability, the vehicular undercover comprising:
 a base material layer containing inorganic fibers and a first solidified thermoplastic binder, the base material layer having a road side surface and a vehicle body side surface;
 an outer layer containing synthetic resin fibers and a second solidified thermoplastic binder, the outer layer being integrated with the road side surface of the base material layer; and
 a synthetic resin layer formed from a synthetic resin film containing a thermoplastic resin whose melt mass-flow rate is 0.1 to 30 g/10 min, the synthetic resin layer having openings so that air can flow in a thickness direction of the synthetic resin layer, the synthetic resin layer being integrated with the vehicle body side surface of the base material layer, wherein
 a weight per unit area of the synthetic resin layer having the openings on the vehicle body side surface of the base material layer is less than a weight per unit area of the outer layer on the road side surface of the base material layer.

2. The vehicular undercover according to claim 1, wherein
 the air permeability of the vehicular undercover is 0.05 cc/cm$^2$/sec to 70 cc/cm$^2$/sec.

3. The vehicular undercover according to claim 1, wherein
 a weight per unit area of the vehicular undercover is 560 g/m$^2$ to 3600 g/m$^2$.

4. The vehicular undercover according to claim 1, wherein
 the weight per unit area of the outer layer is 50 g/m$^2$ to 400 g/m$^2$, and
 the weight per unit area of the synthetic resin layer is 10 g/m$^2$ to 200 g/m$^2$.

* * * * *